(12) United States Patent
Mayer et al.

(10) Patent No.: US 9,107,459 B2
(45) Date of Patent: *Aug. 18, 2015

(54) AEROGRAPHICS AND DENIER DIFFERENTIAL ZONED GARMENTS

(75) Inventors: Kirk M. Mayer, Portland, OR (US); Nathan Demarest, Portland, OR (US); Rebecca P. Hurd, Tigard, OR (US)

(73) Assignee: NIKE, Inc., Beaverton, OR (US)

( * ) Notice: Subject to any disclaimer, the term of this patent is extended or adjusted under 35 U.S.C. 154(b) by 352 days.

This patent is subject to a terminal disclaimer.

(21) Appl. No.: 12/987,249

(22) Filed: Jan. 10, 2011

(65) Prior Publication Data

US 2012/0174281 A1 Jul. 12, 2012

(51) Int. Cl.
| | | |
|---|---|---|
| A41D 5/00 | (2006.01) | |
| A41D 27/28 | (2006.01) | |
| B32B 5/02 | (2006.01) | |
| B32B 5/08 | (2006.01) | |
| B32B 5/14 | (2006.01) | |
| B32B 5/26 | (2006.01) | |
| B32B 7/02 | (2006.01) | |
| A41D 13/00 | (2006.01) | |
| A41D 31/00 | (2006.01) | |

(52) U.S. Cl.
CPC ............ *A41D 27/28* (2013.01); *B32B 5/026* (2013.01); *B32B 5/08* (2013.01); *B32B 5/142* (2013.01); *B32B 5/26* (2013.01); *B32B 7/02* (2013.01); *A41D 13/0015* (2013.01); *A41D 31/0011* (2013.01); *A41D 2400/22* (2013.01); *A41D 2500/10* (2013.01); *A41D 2500/20* (2013.01); *B32B 2262/02* (2013.01); *B32B 2262/14* (2013.01); *B32B 2307/7166* (2013.01); *B32B 2307/724* (2013.01); *B32B 2437/00* (2013.01); *Y10T 428/2481* (2015.01); *Y10T 428/26* (2015.01)

(58) Field of Classification Search
CPC .............. A41D 27/28; A41D 13/0015; A41D 31/0011; A41D 2400/22; A41D 2500/10; A41D 2500/20; B32B 2307/7166; B32B 2307/704; B32B 2437/00
USPC ............... 2/69, 113, 115; 450/93; 139/420 R; 66/169, 169 R, 170
See application file for complete search history.

(56) References Cited

U.S. PATENT DOCUMENTS

| | | |
|---|---|---|
| 5,441,436 A | 8/1995 | Mortez |
| 5,547,733 A | 8/1996 | Rock |
| 5,823,012 A | 10/1998 | Hacskaylo |

(Continued)

OTHER PUBLICATIONS

The International Search Report and Written Opinion of PCT/US12/20723; dated May 10, 2012.

(Continued)

*Primary Examiner* — Shaun R Hurley
*Assistant Examiner* — Andrew W Sutton
(74) *Attorney, Agent, or Firm* — Shook, Hardy & Bacon L.L.P.

(57) ABSTRACT

A zoned moisture management garment is presented, which provides one-way moisture transport from a wearer's body and zones of different moisture management performance. By incorporating dissolvable yarns, removable by a printable paste, with non-dissolvable yarns of different denier per filament, zoned garments with a denier differential mechanism can be created. The zoned garment optimizes evaporative cooling and wicking zones of a garment based upon a sweat profile and contact profile of the wearer.

40 Claims, 5 Drawing Sheets

(56) References Cited

U.S. PATENT DOCUMENTS

| | | |
|---|---|---|
| 6,427,493 B1 | 8/2002 | Kasdan |
| 6,484,325 B1 * | 11/2002 | Lazarus et al. ............... 2/462 |
| 7,217,456 B1 | 5/2007 | Rock |
| 7,395,557 B1 | 7/2008 | Ledyard |
| 7,430,883 B2 | 10/2008 | Sorensen |
| 7,611,999 B2 | 11/2009 | McMurray |
| 2004/0014394 A1 | 1/2004 | Mitchell |
| 2004/0171319 A1 | 9/2004 | Yoon |
| 2006/0046616 A1 * | 3/2006 | Alessi ............... 450/81 |
| 2007/0093162 A1 * | 4/2007 | Holcombe et al. ............ 442/208 |
| 2007/0293106 A1 | 12/2007 | Harber |
| 2008/0070477 A1 | 3/2008 | Barbour |
| 2008/0319521 A1 | 12/2008 | Norris |
| 2012/0178343 A1 * | 7/2012 | Hurd et al. ............... 450/93 |

OTHER PUBLICATIONS

International Search Report and Written Opinion of PCT/US12/20724; Filed Jan. 10, 2012.

Non Final Office Action of Jun. 5, 2013 for U.S. Appl. No. 12/987,235; filed Jan. 10, 2011.

Notice of Allowance and Fee(s) Due mailed Dec. 5, 2013 in U.S. Appl. No. 12/987,235; 19 pages.

* cited by examiner

AEROGRAPHICS AND DENIER DIFFERENTIAL ZONED GARMENTS

CROSS-REFERENCE TO RELATED APPLICATIONS

This application is related to commonly assigned U.S. patent application Ser. No. 12/987,235 entitled Moisture Management Support Garment with a Denier Differential Mechanism filed concurrently herewith on the same date.

FIELD

The present disclosure relates to zoned moisture management apparel for wear during exertion.

BACKGROUND

There are numerous challenges to designing apparel to effectively manage a wearer's perspiration and cooling during exertion. Different areas of a wearer's body perspire at varied rates and further, activity type may affect perspiration patterns. Apparel worn during exercise or activity may vary in contact areas with the wearer, which affects the cooling mechanism.

SUMMARY

During exercise, playing sports, or other exertion, body perspiration evaporates in order to cool the body of a wearer. To complicate matters, a wearer's body perspires at different rates in different zones of the body and cooling via evaporation varies across the body. Perspiration zones also vary for men versus women. Optimizing apparel for moisture management may provide improved performance by tailoring the moisture management properties of different zones of the apparel. Zoned garments may be created by stitching together textile panels of different meshes or porosities; however, this requires introduction of bulky and uncomfortable seams and requires labor intensive stitching.

To this end, a zoned moisture management garment is provided by incorporating a denier differential fabric with aerographic yarn compositions and zoning. A denier differential mechanism may utilize morphological properties of fibers and textiles, to provide moisture management properties. Denier differential refers to yarn of different denier or thickness on the face versus the back of a textile. A moisture management fabric may be engineered with two sides: a facing layer and a back layer. Surface tension and capillary forces drive the moisture from the wearer's skin to the back layer. Moisture then moves from the back layer to the facing layer due to increased surface area of the facing layer. Due to the increased surface area of the facing layer, moisture may be spread out with greater surface area to evaporate. Aerographics generally refers to a method of using two yarn compositions: one that may be dissolvable in a given solvent and one that may not be dissolvable in the solvent. Dissolution of the dissolvable yarn may be confined to specific zones and provides a way to remove a portion of the fabric to increase air flow and porosity of the fabric. By incorporating a dissolvable yarn into the denier differential fabric, certain areas of an exemplary garment may be selected to be more ventilating while other areas or zones of the garment may be selected to promote skin-side dryness by moving moisture away from skin.

In one example of a garment in accordance with the present invention, a zoned moisture management garment is presented, comprising a first fabric layer and a second fabric layer adjacent to the first fabric layer. The second fabric layer may be the inner most layer or skin-side layer of the garment when the garment is worn. The first fabric layer may include a first non-dissolvable yarn of a first denier per filament between about 0.50 and about 1.04 or a microfiber and first dissolvable yarn of a second denier per filament between about 0.50 and 1.04 or a microfiber, wherein at least one zone of the first fabric layer may have the first dissolvable yarn dissolved. The second fabric layer may include a second non-dissolvable yarn of a third denier per filament greater than the first denier per filament, wherein the third denier per filament may be between about 1.04 and 3.50 or a macrofiber and a denier differential between the first denier per filament and the third denier per filament may be at least about 0.54.

An additional example of an exemplary zoned moisture management garment may include, in the second fabric layer, a second dissolvable yarn of a fourth denier per filament greater than the first denier per filament, wherein the fourth denier per filament may be between 1.04 and 3.50 or a macrofiber and a denier differential between the first denier per filament and the fourth denier per filament may be at least about 0.54 and wherein at least one zone of the second fabric layer may have the second dissolvable yarn dissolved. In one example of a zoned moisture management garment, the first non-dissolvable yarn may be synthetic and the second non-dissolvable yarn may be synthetic. In another exemplary zoned moisture management garment, the first non-dissolvable yarn may be polyester and the second non-dissolvable yarn may be polyester. The first fabric layer and the second fabric layer of an exemplary zoned moisture management garment may be constructed by knitting or weaving. In one example, the first fabric layer and the second fabric layer of a zoned moisture management garment may be circular double knit. Alternately, the first fabric layer and the second fabric layer may be circular, plaited single-knit. The first dissolvable yarn may comprise between about 10% and about 40% of the fabric of the zoned moisture management garment, such as 30% of the fabric of zoned moisture management garment.

Furthermore, at least one zone of the first fabric layer where the second dissolvable yarn is dissolved may be a zone pattern, logo, or shape. In another example, the at least one zone may be placed on the garment according to a sweat profile of an athlete to provide desired moisture management and/or cooling properties. In an example, where the garment may be a shirt having a shoulder area, a chest area, an upper back area, an abdomen area, an armpit area, and a lower back area, the at least one zone may be located at the shoulder area, armpit area, abdomen area, and lower back area. An exemplary zoned moisture management garment may further comprise an additional fabric layer including a third non-dissolvable yarn of a fourth denier per filament. The additional fabric layer may include a third dissolvable yarn of a fifth denier per filament and at least one zone of the additional fabric layer may have the second dissolvable yarn dissolved.

In another example of a garment in accordance with the present invention, a zoned moisture management garment may be provided comprising a first fabric layer and a second fabric layer adjacent to the first fabric layer, wherein the second fabric layer may be the skin-side layer or the inner most layer of the garment when the garment is worn. The first fabric layer of the exemplary zoned moisture management garment may include a non-dissolvable microfiber, such as a first non-dissolvable yarn of a first denier per filament of between about 0.50 and about 1.04. The second fabric layer of the exemplary zoned moisture management garment may include a non-dissolvable macrofiber or a second non-dissolvable yarn of a second denier per filament greater than the first denier per filament and a dissolvable macrofiber such as a first dissolvable yarn of a third denier per filament greater than the first denier per filament, wherein the second denier per filament and the third denier per filament are between about 1.04 and about 3.50 and a denier differential between the first denier per filament and the second denier per filament may be at least about 0.54. Furthermore, the second fabric layer of the exemplary zoned moisture management garment may have at least one zone with the first dissolvable yarn dissolved.

Additionally, the first fabric layer of the exemplary zoned moisture management garment may include a second dissolvable microfiber, such as a second dissolvable yarn of a fourth denier per filament between about 0.50 and 1.04, wherein at least one zone of the first fabric layer may have the second dissolvable yarn dissolved. The exemplary zoned moisture management garment may have the at least one zone of the second fabric layer placed according to a sweat profile. The first non-dissolvable yarn may be synthetic yarn and the second non-dissolvable yarn may be synthetic yarn. For example, the first non-dissolvable yarn may be polyester and the second non-dissolvable yarn may be polyester. The first fabric layer and the second fabric layer of a zoned moisture management garment may be constructed by knitting or weaving. In one example, the first fabric layer and the second fabric layer of a zoned moisture management garment may be circular double knit. The first fabric layer and the second fabric layer of an exemplary zoned moisture management garment may be circular, plaited single-knit. The first dissolvable yarn of the zoned moisture management garment may be between about 10% and 40 percent of the zoned moisture management garment.

In an additional example, the at least one zone of the second fabric layer of an exemplary zoned moisture management garment having the first dissolvable yarn removed may be a zone pattern, logo, or shape. An exemplary zoned moisture management garment may also comprise at least one additional fabric layer of a third non-dissolvable yarn of a fifth denier per filament. The at least one additional fabric layer may also include a third dissolvable yarn of a sixth denier per filament, wherein at least one zone of the additional fabric layer may have the third dissolvable yarn dissolved.

In another example, a zoned moisture management garment having a first fabric layer and a second fabric layer is presented. The first fabric layer may have a non-dissolvable microfiber yarn or a first non-dissolvable yarn of a first denier per filament of about 0.50 and about 1.04. The second fabric layer may be adjacent to the first fabric layer and may also be the skin-side or inner most layer of the garment when the garment is worn. The second fabric layer may include a non-dissolvable macrofiber or a second non-dissolvable yarn of a second denier per filament greater than the first denier per filament, wherein the second denier per filament may be between about 1.04 and about 3.50. A denier differential between the first denier per filament and the second denier per filament may be at least about 0.54. Furthermore, at least one of the first fabric layer, the second fabric layer, or both, may have a first dissolvable yarn and at least one zone of the at least one of the first fabric layer, the second fabric layer, or both further comprising the first dissolvable yarn may have the first dissolvable yarn dissolved. The at least one zone of the exemplary zoned moisture management garment may be determined by a sweat profile.

In an additional example, the first non-dissolvable yarn and the second non-dissolvable yarn may be a synthetic material such as polyester. In an exemplary zoned moisture management garment, wherein the garment may be a shirt having a shoulder area, chest area, upper back area, abdomen area, armpit area, and a lower back area, the at least one zone having the first dissolvable yarn dissolved may be located at the shoulder area, armpit area, abdomen area, and lower back area. The first fabric layer and the second fabric layer of an exemplary zoned moisture management garment may be constructed by knitting or weaving. For example, the first fabric layer and the second fabric layer of a zoned moisture management garment may be constructed of a circular double-knit or a circular, plaited single-knit.

Additionally, the first dissolvable yarn of an exemplary zoned moisture management garment may comprise between about 10% and 40% of the fabric of the garment, for example 30% of the fabric. At least one zone, having the first dissolvable yarn removed, may be a zone pattern, logo, or shape. A zoned moisture management garment may include at least one additional fabric layer of a third non-dissolvable yarn of a third denier per filament. The at least one additional fabric layer may further comprise a second dissolvable yarn, wherein at least one zone of the at least one additional fabric layer may have the second dissolvable yarn dissolved.

An additional example of a zoned moisture management garment includes a first fabric layer and a second fabric layer. The first fabric layer may have a first non-dissolvable microfiber, such as a non-dissolvable yarn of a first denier per filament between about 0.50 and about 1.04. The second fabric layer may be the skin-side layer or inner most layer of the garment when the garment is worn and may be adjacent to the first fabric layer. The second fabric layer may have a non-dissolvable macrofiber or a second non-dissolvable yarn of a second denier per filament greater than the first denier per filament, wherein the second denier per filament is between about 1.04 and about 3.50. A denier differential between the first denier per filament and the second denier per filament may be at least about 0.54. Further, at least one of the first fabric layer, the second fabric layer, or both may include a first dissolvable yarn. At least one of the first fabric layer, the second fabric layer, or both having the first dissolvable yarn may be the first dissolvable yarn dissolved in a location of the zoned moisture management garment determined by a sweat profile of an athlete and a contact map of the zoned moisture management garment to the athlete. The sweat profile may include at least one area of increased sweating, and the contact map may include at least one area of increased contact and at least one area of less contact. The location for the at least one zone may be generally in the at least one area of less contact.

This section provides a general summary of the disclosure, and is not a comprehensive disclosure of its full scope or all of its features. Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1A:
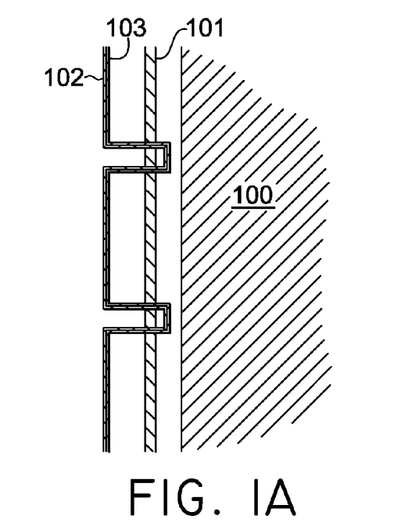
FIGS. 1A-B are schematics of exemplary zoned moisture management garment layers in which the first fabric layer may have one dissolvable yarn dissolved.

Referring to FIG. 1A, an exemplary zoned moisture management garment without at least one zone is illustrated. The zoned moisture management garment fabric may include two layers, which may be woven or knit, including circular double-knit or circular, plaited single-knit or any known warp knit. Any appropriate pattern or method of weaving or knitting may be employed. The first fabric layer may include a first non-dissolvable yarn 102 and a first dissolvable yarn 103. Generally the first non-dissolvable yarn 102 may be a microfiber and may have a denier per filament of less than or equal to about 1.04 denier per filament, such as about 0.50 to about 1.04 denier per filament. The first dissolvable yarn 103 may be a microfiber and may have a denier per filament of less than or equal to about 1.04 denier per filament, for example about 0.50 to about 1.04 denier per filament. The first dissolvable yarn 103 and the first non-dissolvable yarn 102 may have similar or differing thickness. The first non-dissolvable yarn 102 may be any synthetic, including polyester, and the first dissolvable yarn 103 may be any yarn which will dissolve under conditions which will not affect the first non-dissolvable yarn 102 or the second non-dissolvable yarn 101, such as rayon, cotton, Lyocell, other cellulosic feedstock, and/or dissolvable synthetic fiber, such as dissolvable polyester. Also, the first dissolvable yarn 103 may be up to 40% of the overall weight or volume of the fabric, for example 30% of the total weight or volume of the fabric.

The second fabric layer may include a second non-dissolvable yarn 101, which may be a macrofiber and have a second denier per filament of greater than or equal to about 1.04 denier per filament, such as about 1.04 to about 3.50. The second non-dissolvable yarn may be any synthetic, such as polyester. The denier differential between the first non-dissolvable yarn 102 and the second non-dissolvable yarn 101 may be at least about 0.54. Briefly, the denier differential is the absolute difference in denier per filament between two yarns. The denier differential moisture transport is described in further detail in FIGS. 6A-D. The exemplary zoned moisture management garment is FIG. 1A is shown such that the second fabric layer 101 is adjacent to the first fabric layer 102/103 and the second fabric layer 101 is next to the wearer 100 when the garment is worn.

Figure 1B:
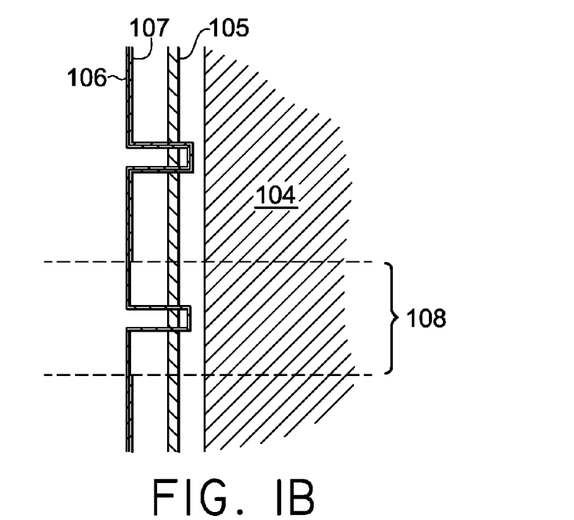

An exemplary zoned moisture management garment having at least one dissolved zone 108 is shown in FIG. 1B. The second fabric layer may include the second non-dissolvable yarn 105 with a denier differential of about 0.54 over the first non-dissolvable yarn 106 of the first fabric layer and may have a denier differential of about 0.54 over the first dissolvable yarn 107 of the first fabric layer. As described previously, it may be desired to provide an exemplary moisture management garment that may have different porosity and ventilation in specific zones of the garment. These zones may be determined by the sweat profile and contact profile of the wearer and are described below.

In FIG. 1B, a zone 108 is illustrated in an exemplary garment where a portion of the first dissolvable yarn 107 is removed. These zones may be removed for example, by printing a paste or gel which is capable of dissolving the first dissolvable yarn 107. As the paste or gel may be printed, the zones may be applied as logos, patterns, or other graphics. In one instance, the first non-dissolvable yarn may be a synthetic yarn, such as polyester yarn and the first dissolvable yarn may be a distinct cellulosic yarn, such as rayon yarn. The garment may be screen printed with the paste which dissolves only the dissolvable yarn content leaving behind the non-dissolvable yarns which form a mesh fabric structure. The mesh area may have greatly increased porosity relative to the undissolved portions of the fabric, which increases the air permeability of the fabric. This approach may reduce the fabric weight and may avoid bulky seams resulting from traditional piecing together of fabrics of different meshes to produce a zoned garment. The screen printing approach also provides a route for creating patterned or graphic meshes.

Figure 2A:
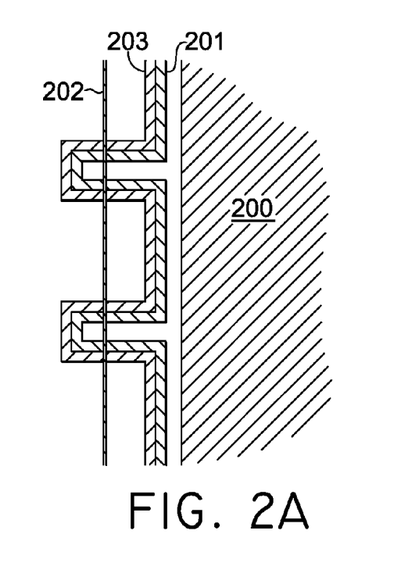
FIGS. 2A-B are schematics of exemplary zoned moisture management garment layers in which the second fabric layer may have one dissolvable yarn dissolved.

Another exemplary zoned moisture management garment is illustrated in FIG. 2A. The garment may comprise a first fabric layer 202 having a first non-dissolvable yarn 202. The garment may also comprise a second fabric layer 203/201 having a second non-dissolvable yarn 201 and a first dissolvable yarn 203. Fabric layers of the garment may be circular double-knit or circular, plaited single-knit or any known warp knit. In another example, fabric layers of the garment may be woven. The first non-dissolvable yarn 202 be a microfiber and may have a denier per filament of less than or equal to about 1.04 denier per filament, such as about 0.50 to about 1.04 denier per filament. The second fabric layer may include a second non-dissolvable yarn 201, which may be a macrofiber and have a second denier per filament of greater than or equal to about 1.04 denier per filament, such as about 1.04 to about 3.50, and a first dissolvable yarn 203. The first dissolvable yarn 203 may have a denier per filament of greater than or equal to about 1.04 denier per filament, such as about 1.04 to about 3.50. The first dissolvable yarn 203 and the second non-dissolvable yarn 201 may have similar or differing thickness. The first dissolvable yarn 203 may be up to 40% of the total weight or volume of the fabric of the garment, such as 30% or between about 10% and about 40%. The second non-dissolvable yarn 201 may be any synthetic, such as polyester. The second non-dissolvable yarn 201 may be polyester and the first dissolvable yarn 203 may be any yarn which will dissolve under conditions which will not affect the first non-dissolvable yarn 202 or the second non-dissolvable yarn 201, such as rayon, cotton, Lyocell, other cellulosic feedstock, and/or dissolvable synthetic fiber, such as dissolvable polyester. The denier differential between the first non-dissolvable yarn 202 and the second non-dissolvable yarn 201 may be at least about 0.54.

Figure 2B:
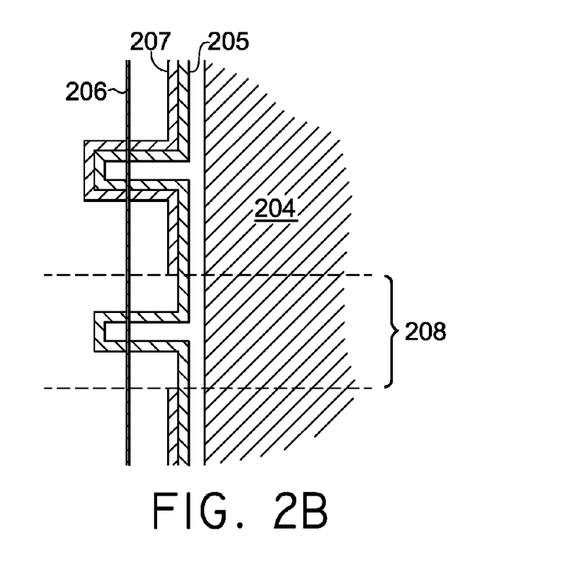

An exemplary zoned moisture management garment having at least one dissolved zone 208 is shown in FIG. 2B. The second fabric layer may include the second non-dissolvable yarn 205 with a denier differential of about 0.54 over the first non-dissolvable yarn 206 of the first fabric layer. As described previously, it may be desired to provide an exemplary moisture management garment that may have different porosity and ventilation in specific zones of the garment. These zones may be determined by the sweat profile of the wearer and contact profile of the garment to the wearer such as is described below. In FIG. 2B, a zone 208 is illustrated in an exemplary garment where a portion of the first dissolvable yarn 207 is removed. These zones may be removed, for example, by printing a paste or gel which is capable of dissolving the first dissolvable yarn 207. As the paste or gel may be printed, the zones may be applied as logos, patterns, or other graphics.

Figure 3A:
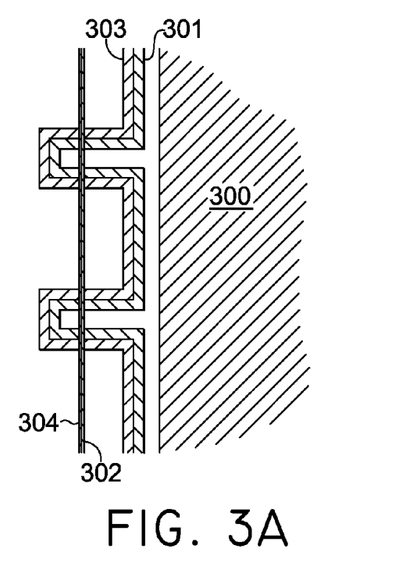
FIGS. 3A-D are schematics of exemplary zoned moisture management garment layers in which the first and the second fabric layers each have one dissolvable yarn dissolved.

Another example of a zoned moisture management garment is illustrated in FIG. 3A before dissolving the dissolvable yarn. In FIG. 3A, the first fabric layer may comprise a first dissolvable yarn 304 and a first non-dissolvable yarn 302. Both yarns in the first fabric layer 304/302 may be microfibers having a denier per filament of less than or equal to about 1.04 denier per filament, such as about 0.50 to about 1.04 denier per filament. However, the first dissolvable yarn 304 and the first non-dissolvable yarn 302 may have similar or differing thicknesses. The second fabric layer may comprise a second dissolvable yarn 303 and a second non-dissolvable yarn 301. Both yarns of the second fabric layer may be macrofibers having a denier per filament of greater than or equal to about 1.04 denier per filament, such as about 1.04 to about 3.50. The second dissolvable yarn 303 and the second non-dissolvable yarn 301 may have similar or differing thicknesses. The denier differential between the first non-dissolvable yarn 302 and the second non-dissolvable yarn 301 may be at least about 0.54. Similarly, the denier differential between the first non-dissolvable yarn 302 and the second dissolvable yarn may be at least about 0.54. The denier differential between the first dissolvable yarn 304 and the second non-dissolvable yarn 301 may be at least about 0.54. The denier differential between the first dissolvable yarn 304 and the second dissolvable yarn may be at least about 0.54. The second fabric layer is the skin-side layer or the inner most layer next to the wearer 300 adjacent to the first fabric layer.

Figure 3B:
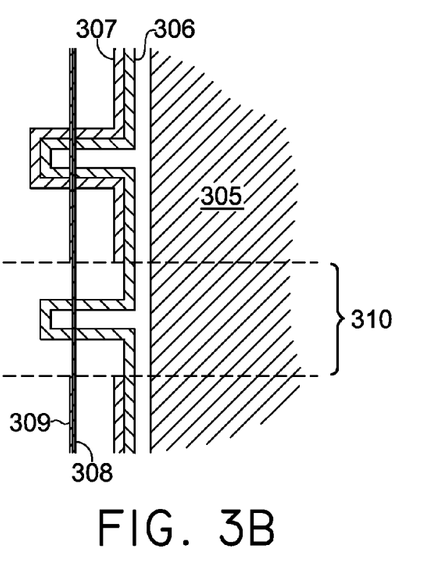
Figure 3C:
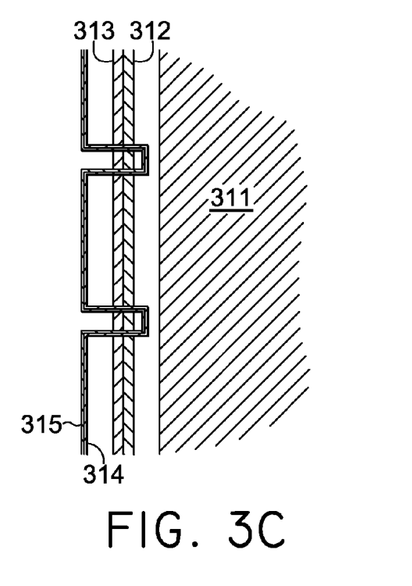
Figure 3D:
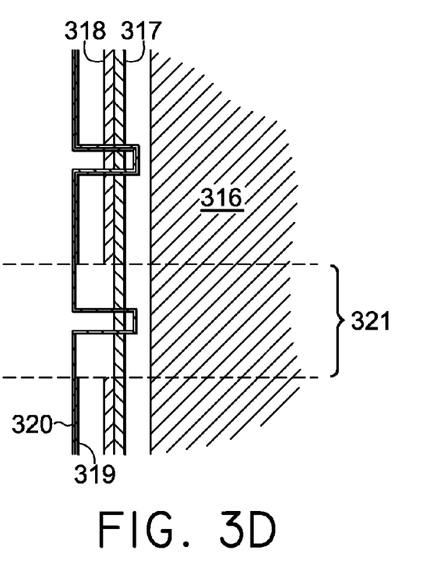

In FIG. 3B, an exemplary zoned moisture management garment is illustrated with at least one zone having one or more of the dissolvable yarns dissolved. Zone 310 as shown in FIG. 3B illustrates both the first dissolvable yarn 309 and the second dissolvable yarn 307 as dissolved within the zone 310. FIG. 3C-3D illustrate additional examples of a zoned moisture management garment having a first dissolvable yarn 314, a first non-dissolvable yarn 315, a second dissolvable yarn 313, and a second non-dissolvable yarn 312. The exemplary garment in FIG. 3D is shown with a zone 321 having the dissolvable yarns dissolved according to the sweat profile of the wearer 316. However, these illustrations are a few examples of a zoned moisture management garment with a plurality of dissolvable yarns in accordance with the present invention: there are numerous additional embodiments. Other examples may include a first dissolvable yarn of one composition and a second dissolvable yarn of another composition such that one yarn may be selectively removed. Furthermore, plurality of dissolvable and non-dissolvable yarns featuring a denier differential may be employed to achieve improved moisture management.

Figure 4A:
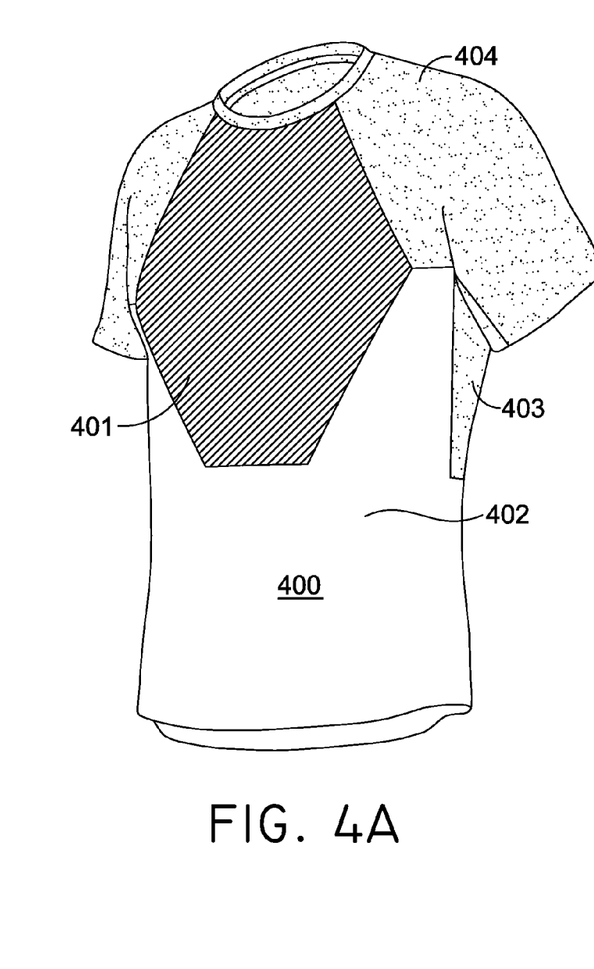
FIGS. 4A-B are schematics of exemplary zoned moisture management garments wherein the garment is a shirt.
Figure 4B:
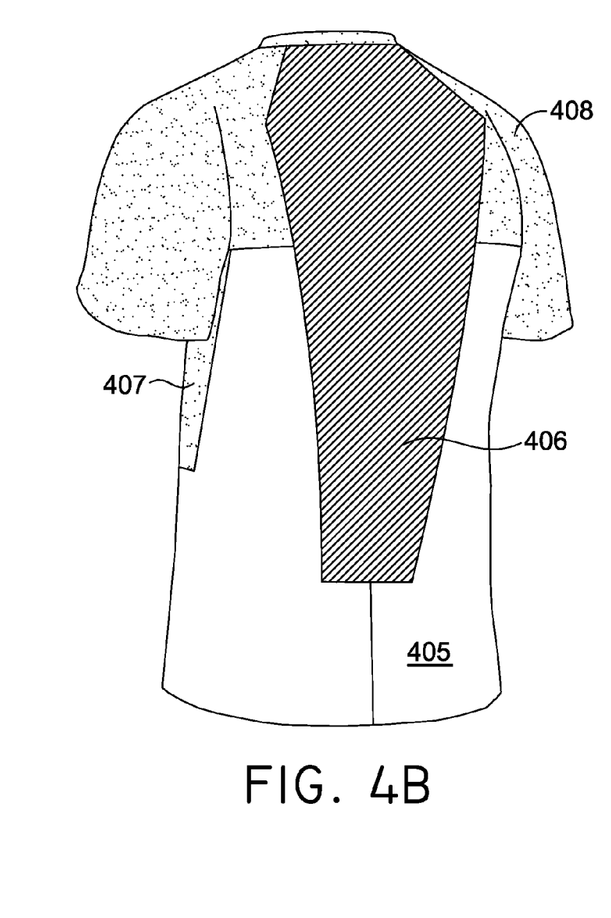

An example of a zoned moisture management garment is shown in FIGS. 4A and 4B. FIG. 4A is the front 402 of a zoned moisture management shirt that may include a shoulder area 404, a chest area 401, an abdomen area 402, and armpit area 403. FIG. 4B shows the back 405 of a zoned moisture management shirt that may include a shoulder area 408, an upper back area 406, an armpit area 407, and a lower back area 409. Each of these areas of the garment may comprise a zone of a garment having a first fabric layer and a second fabric layer. The garment may be constructed of one fabric of uniform composition or each zone may have a different proportion of the dissolvable yarns. Further, the proportion of dissolvable yarn in zones may be varied: the chest area 401 may be up to about 10% removed, such as between about 0-10% removed; the abdomen area 402 may be about 90% or more removed; the shoulder area 404 may be up to about 50% removed, such as between about 30-50% removed; the upper back area 406 may be up to about 10% removed, such as between about 0-10% removed; and the lower back area 409 may be about 90% or more removed. Alternately or in conjunction, the degree of dissolution may be varied in zones to achieve the zones of different porosities or meshes.

The garment illustrated in FIGS. 4A and 4B has numerous advantages. A zoned garment capable of one-way moisture transport in selected areas can be made without bulky and uncomfortable seams between panels of different meshes. Garments may also be designed for particular evaporative cooling scenarios: for example, where evaporative cooling is more effective for the shoulder area due to air flow, the mesh of that area may be increased by dissolving the dissolvable yarn component of either the first fabric layer or the second fabric layer. However, in the chest area where sweat removal may occur via wicking, the denier differential between the yarns of the first fabric layer and the second fabric layer provides one-way moisture transport from the wearer's skin to the outer surface of the garment. The garment may be made lighter by removing the dissolvable yarn altogether in the lower back and abdomen regions.

In order to create a zoned moisture management garment, perspiration across the wearer's skin may be determined to provide a sweat profile, including areas of greatest perspiration such as the armpits or chest area. The sweat profile may vary from wearer to wearer and may differ greatly between men and women. For zoned garment optimization, areas of contact between the wearer and portions of the garment may be determined. In one example, the areas of contact may be overlaid with a sweat map to determine garment zoning. This information and other data regarding sweating profile during various sports activities may be used to determine the ideal zoning for a zoned moisture management garment. Sweat profiles and contact areas may also vary based upon the sport or exercise that the wearer is engaging.

A sweat profile and a contact map of the areas of contact between a garment and a wearer may provide a guide for the zone placement of the zoned moisture management fabric. In one instance, a contact map may be created by determining what areas of a garment contact the wearer more in certain areas, such as the shoulder area, than in the other areas of the garment, such as the abdomen area. In those contact areas, the garment may provide the most appropriate moisture management means using the denier differential wicking mechanism described in detail below. However, in the areas outside of contact areas, the wearer may also be perspiring. Due to the reduced contact of the garment to the wearer, ventilation may be the most appropriate means for sweat management. To introduce the ventilated areas or zones into a location of the garment, a dissolvable yarn comprising a portion of the zoned moisture management garment may be dissolved in the zones where increased porosity and ventilation are desired. The resultant zoned moisture management garment may provide a denier differential moisture management mechanism in contact areas and may also provide a ventilation moisture management mechanism in areas of less contact.

Figure 5A:
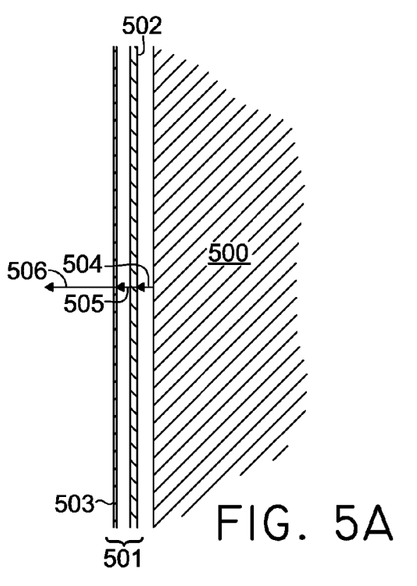
FIGS. 5A-D are schematics of an exemplary denier differential fabric with an illustrative moisture path from the wearer's body surface to the exterior of the fabric and exemplary denier differential fabrics with one or more additional fabric layers.

Referring to FIG. 5A, an example of a zoned moisture management fabric is depicted and the denier differential mechanism is described. The zoned moisture management fabric 501 may comprise two layers: a first fabric layer 503 and a second fabric layer 502. Additional embodiments may include additional layers adjacent first or second fabric layer or both that may provide tailored levels of moisture management and support in a composite fabric. Each fabric layer may include at least one non-dissolvable yarn and at least one dissolvable yarn. The at least one non-dissolvable yarn may be a synthetic, such as polyester, and the at least one dissolvable yarn may be rayon, cotton, Lyocell, other cellulosic feedstock, and/or dissolvable synthetic fiber, such as dissolvable polyester.

The first fabric layer 503 and the second fabric layer 502 may be constructed separately, by weaving or knitting, and assembled to form the fabric. In one example, the layer 503 and the second fabric layer 502 may be constructed continuously, by weaving or knitting, to form a seamless fabric. Any appropriate pattern or method of weaving or knitting may be employed, for example plain weaving, satin weaving, circular double knit, or circular plaited single knit. The second fabric layer 502 is the layer adjacent to the wearer's body 500 and the first fabric layer 503 is adjacent to the second fabric layer 502. The wearer's body 500 perspires and moisture may be adsorbed 504 from the body 500 surface to the first fabric layer 503. The denier differential, which is discussed in greater detail below, between the first fabric layer 503 and the second fabric layer 502, can provide a difference in porosity and surface area wherein the first fabric layer 503 may have a greater surface area and smaller pores than the second fabric layer 502. The smaller pores and greater surface area results in increased capillary force for aqueous solutions for the first fabric layer 503 than the second fabric layer 502. The denier differential produces wicking 505 from the second fabric layer 502 to the first fabric layer 503. The moisture, once transported to the first fabric layer 503, may be adsorbed to and spread over the increased surface area of the first fabric layer 503. The increased surface area of the first fabric layer 503 can encourage moisture evaporation 506 from the first fabric layer 503. The moisture management fabric can thus transport moisture efficiently from the wearer 500, to the second fabric layer 502 to keep the wearer comfortable, and to the first fabric layer 503 to promote evaporation from the fabric to keep the wearer dry.

Figure 5B:
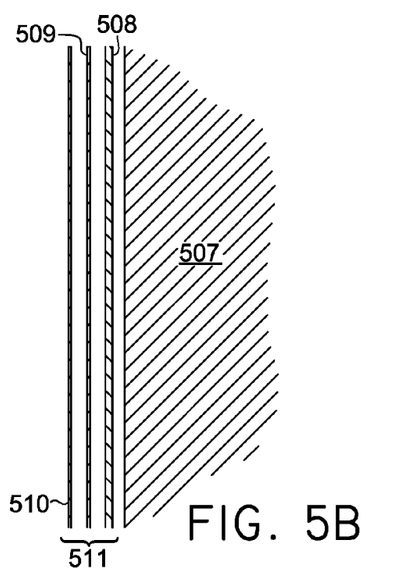
Figure 5C:
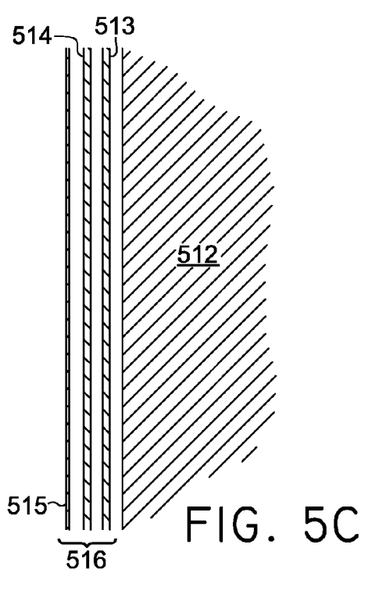
Figure 5D:
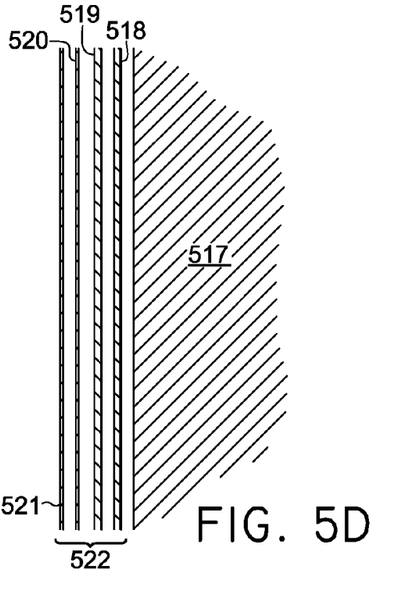

FIGS. 5B-D illustrate examples of a zoned moisture management fabric with at least one additional fabric layer. FIG. 5B illustrates a third fabric layer 509 disposed between the first fabric layer 510 and the second fabric layer 508. Each fabric layer may include at least one non-dissolvable yarn and at least one dissolvable yarn. The at least one non-dissolvable yarn may be a synthetic material, such as polyester, and the at least one dissolvable yarn may be a cellulosic material, such as rayon. In a zoned moisture management fabric, the third fabric layer 509 may be constructed by knitting or weaving a third yarn or thread. The first fabric layer may be constructed by knitting a first yarn and the second fabric layer may be constructed by knitting a second yarn. In another example, the third fabric layer may be constructed by weaving a third yarn or thread. In FIG. 5B, the third fabric layer 509 may be constructed such that the porosity and surface area of the third fabric layer 509 is greater than the porosity and surface area of the second fabric layer 508. The third fabric layer 509 may be constructed by knitting third yarn of a third denier per filament, which is comparable in size to or larger than the first yarn. The denier per filament of the third fabric layer 509 may be greater than the denier per filament of the first fabric layer 510 and less than the denier per filament of the second fabric layer 508 such that a gradient of surface areas and porosities is provided. The first fabric layer and the third fabric layer may be woven separately or together or knitted separately, double-knit, or plaited single-knit. The second fabric layer may be woven or knitted separately. The third fabric layer and the second fabric layer may be knitted separately, circular double knit, or circular plaited single knit. The third fabric layer and the second fabric layer may be woven separately or together. The first fabric layer may be knitted separately or woven separately.

FIG. 5C illustrates a zoned moisture management fabric 516 having at least a third fabric layer 514 which is an intermediate layer of the fabric disposed between the first fabric layer 515 and the second fabric layer 513. In a zoned moisture management fabric 516, the third fabric layer 514 may be constructed by weaving or knitting a third yarn or thread. The first fabric layer 515 may be constructed by weaving or knitting a first yarn or thread; and the second fabric layer 513 may be constructed by weaving or knitting a second yarn or thread. Each fabric layer may include at least one non-dissolvable yarn and at least one dissolvable yarn. The at least one non-dissolvable yarn may be a synthetic, such as polyester, and the at least one dissolvable yarn may be rayon, other cellulosic feedstock, and/or dissolvable synthetic such as dissolvable polyester. In FIG. 5C, the third fabric layer 514 may be constructed such that the porosity and surface area of the third fabric layer 514 is less than the porosity and surface area of the first fabric layer 515. In one example, the third fabric layer 514 may be constructed warp knitting a yarn or thread, which is comparable or less than in size to yarn or thread of the second fabric layer 513. The denier per filament of the yarns of third fabric layer 514 may be greater than the denier per filament of the yarns of first fabric layer 515 and less than the denier per filament of the yarns of second fabric layer 513 such that a gradient of surface areas and porosities is provided. The first fabric layer 515 and the third fabric layer 514 may be circular double-knit and/or circular plaited single-knit. Alternate means of constructing the fabric layers may also be employed. The second fabric layer 513 may be woven or knitted separately. The third fabric layer 514 and the second fabric layer 513 may be knitted separately, circular double knit, or circular plaited single knit. The first fabric layer 515 may be knitted or woven separately.

FIG. 5D illustrates moisture management fabric 522 having at least a third fabric layer 520 and a fourth fabric layer 519 each of which is an intermediate layer of the fabric disposed between the first fabric layer 521 and the second fabric layer 518. The third fabric layer 520 may be constructed by knitting or weaving a third yarn or thread. The fourth fabric layer 519 may be constructed by knitting or weaving a third yarn or thread. In one example, the first fabric layer 521 may be constructed by warp knitting a first yarn or thread; and the second fabric layer 518 may be constructed by warp knitting a second yarn or thread. Each fabric layer may include at least one non-dissolvable yarn and at least one dissolvable yarn. The at least one non-dissolvable yarn may be polyester and the at least one dissolvable yarn may be rayon. In FIG. 5D, the fabric 522 may be constructed such that the porosity and surface area of the third fabric layer 520 is less than the porosity and surface area of the first fabric layer 521 and the porosity and surface area of the fourth fabric layer 519 is greater than the porosity and surface area of the second fabric layer. In one example, he third fabric layer 520 may have a porosity and surface area between that of the fourth fabric layer 519 and the first fabric layer 521; and the fourth fabric layer 519 may have a porosity and surface area between that of the third fabric layer 520 and the second fabric layer. The first fabric layer 521, the second fabric layer 518, the third fabric layer 520, and the fourth fabric layer 519 may be woven or knitted separately. Alternatively, adjacent layers, such as the first fabric layer 521 and the third fabric layer 520, the third fabric layer 520 and the fourth fabric layer 519, the fourth fabric layer 519 and the second fabric layer 518 may be double-knit or plaited single-knit and combined with the remaining single knit, circular double-knit, or circular plaited single-knit layers.

Any combination of the examples illustrated in FIGS. 5A-D may be employed to achieve a zoned moisture management fabric. A plurality of fabric layers may be used to provide a gradient of surface areas and porosities for a composite fabric. Fabric for garments in accordance with the present invention may also include a plurality of proportions of dissolvable yarn to non-dissolvable yarn. Optionally, additional fabric layers adjacent to the first fabric layer and second fabric layer may have similar porosity and surface area as the contacting first fabric layer and second fabric layer. By way of further example, a plurality of fabric layers may be included to provide a zoned moisture management fabric with specific moisture management properties.

Figure 6A:
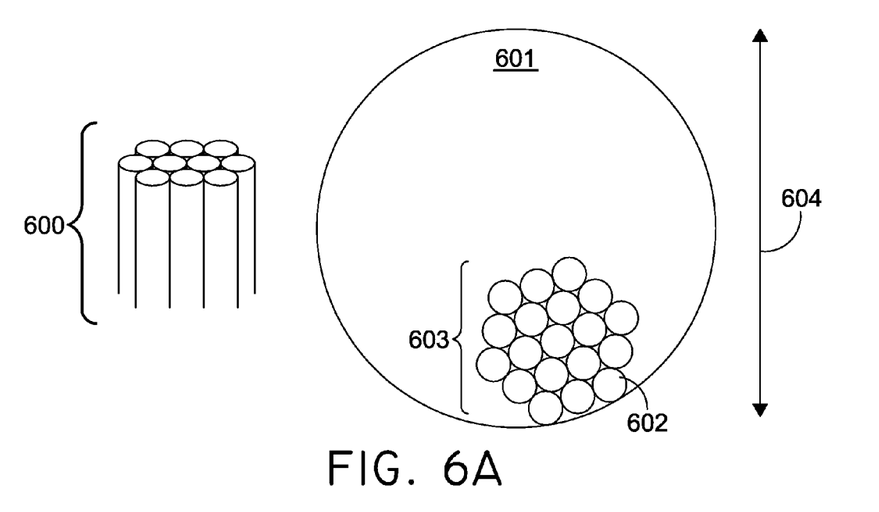
FIGS. 6A-B are illustrations of the exemplary yarns for a denier differential fabric.
Figure 6B:
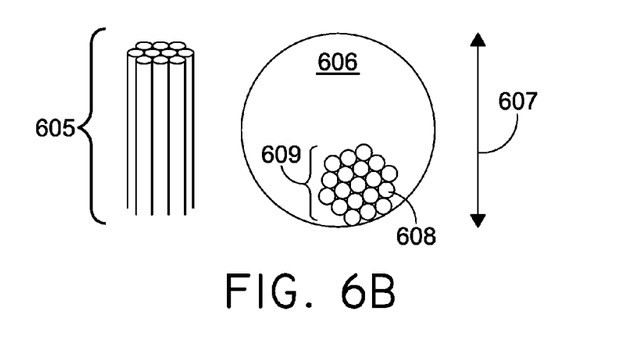

FIGS. 6A-B illustrate examples of the yarns that may be employed in the construction of the denier differential fabric. The yarns depicted in FIGS. 6A-B are not to scale and furthermore not limiting to yarns or fibers used. FIG. 6A illustrates an exemplary second yarn 601 that may be used to construct a zoned moisture management support garment. The yarn may be a monofilament or multifilament yarn of a synthetic or natural fiber. The yarn may be a filament yarn or a spun yarn. The exemplary second yarn 601 may be a bundle 603 of individual filaments 602. The total yarn size 604 may be measured in denier, for example 9,0000 m of the exemplary yarn weighs X g has a size of X denier. The denier per filament is calculated by dividing the total yarn size (X denier) by the total number 700 of filaments 602. In FIG. 6B, an exemplary first yarn 606 may be used to construct a zoned moisture management support garment. The exemplary first yarn 606 may be a bundle 609 of individual filaments 608 of any synthetic or natural fiber. The exemplary first yarn 606 may have a size 607 represented as Y denier, for a first yarn 606 weighing Y g for 9,000 m. The denier per filament is calculated by dividing the total yarn size (Y denier) by the total number 605 of filaments 608. A yarn of less than or equal to about 1.04 denier per filament may be a microfiber. The denier differential may be described as the difference in the denier per filament of the first yarn and the denier per filament of the second yarn. The first yarn 606 may be composed of polyester and the second yarn 601 may be composed of polyester. Moreover, surface treatment or additional modification may be employed to impart a greater relative hydrophobicity to the macrofiber or a great relative hydrophillicity to the microfiber. In one example, the employment of a cellulosic fiber for the dissolvable yarn in a fabric layer may have a higher moisture regain to provide moisture management via absorptive capacity as well as denier differential in the non-dissolved portions of a moisture management garment or fabric. Not shown are optional third and fourth yarns which may also be a bundle of individual filaments or a synthetic or natural fiber. Optional third and fourth yarns may also be measured in terms of a third and fourth denier per filament, respectively.

In one example, the first fabric layer may be knitted or woven of a first yarn of a first denier per filament of less than or equal to about 1.04 denier per filament or a microfiber, such as about 0.50 to about 1.04 denier per filament. The second fabric layer may be knitted or woven of a second yarn of a second denier per filament of greater than or equal to about 1.04 denier per filament or a macrofiber, such as about 1.04 to about 3.50. The denier differential between the first yarn and the second yarn may be at least about 0.54. The third fabric layer may be knitted or woven of a third yarn of a third denier per filament. In one example, the third denier per filament is less than or equal to about 1.04 denier per filament or a microfiber, such as about 0.50 to about 1.04 denier per filament. In another example, the third denier per filament is greater than or equal to about 1.04 or a macrofiber, such as about 1.04 to about 3.50. The third denier per filament may be a value less than the second denier per filament but greater than the first denier per filament. In another example, the fourth fabric layer may be knitted or woven of a fourth yarn of a fourth denier per filament. The fourth denier per filament may be less than or equal to about 1.04 denier per filament or a microfiber, such as about 0.50 to about 1.04 denier per filament. Alternatively, the fourth denier per filament may be greater than or equal to about 1.04 or a macrofiber, such as about 1.04 to about 3.50. The fourth denier per filament may be a value less than the second denier per filament but greater than the first denier per filament.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and may be used in a selected embodiment, even if not specifically shown or described.

What is claimed is:

1. A zoned moisture management garment comprising:
a first fabric layer comprising a first non-dissolvable yarn of a first denier per filament between about 0.50 and about 1.04 and a first dissolvable yarn of a second denier per filament between about 0.50 and about 1.04, the first fabric layer comprising a first zone and a second zone, wherein the first zone of the first fabric layer comprises the first dissolvable yarn dissolved and the first non-dissolvable yarn, and wherein the second zone of the first fabric layer comprises the first dissolvable yarn and the first non-dissolvable yarn, and wherein the first zone and the second zone are seamlessly adjacent forming a mesh fabric structure; and
a second fabric layer adjacent the first fabric layer comprising a second non-dissolvable yarn of a third denier per filament greater than the first denier per filament, wherein the third denier per filament is between 1.04 and 3.50 and a denier differential between the first denier per filament and the third denier per filament is at least about 0.54, and wherein the second fabric layer is the inner most layer of the garment when the garment is worn.

2. The zoned moisture management garment of claim 1, the second fabric layer further comprises a second dissolvable yarn of a fourth denier per filament greater than the first denier per filament, wherein the fourth denier per filament is between 1.04 and 3.50 and a denier differential between the first denier per filament and the fourth denier per filament is at least about 0.54 and wherein at least one zone of the second fabric layer has the second dissolvable yarn dissolved.

3. The zoned moisture management garment of claim 1, wherein the first non-dissolvable yarn is a synthetic and the second non-dissolvable yarn is a synthetic.

4. The zoned moisture management garment of claim 1, wherein the first fabric layer is knitted and the second fabric layer is knitted.

5. The zoned moisture management garment of claim 4, wherein the first fabric layer and the second fabric layer is circular double knit.

6. The zoned moisture management of claim 4, wherein the first fabric layer and the second fabric layer is circular, plaited single-knit.

7. The zoned moisture management garment of claim 1, wherein the first fabric layer is woven and the second fabric layer is woven.

8. The zoned moisture management garment of claim 1, wherein the first dissolvable yarn comprises between about 10 and about 40 percent of the zoned moisture management garment.

9. The zoned moisture management garment of claim 1, wherein the first zone of the first fabric layer having the first dissolvable yarn dissolved is a pattern, logo, or shape.

10. The zoned moisture management garment of claim 1, further comprising at least one additional fabric layer comprising a third non-dissolvable yarn of a fourth denier per filament.

11. The zoned moisture management garment of claim 10, the at least one additional fabric layer further comprising a third dissolvable yarn of a fifth denier per filament, wherein at least one zone of the at least one additional fabric layer has the third dissolvable yarn dissolved.

12. The zoned moisture management garment of claim 1, wherein the first zone is placed according to a sweat profile of an athlete, wherein the sweat profile comprises at least one area of increased sweating.

13. The zoned moisture management garment of claim 1, wherein the garment is a shirt having a shoulder area, a chest area, an upper back area, an abdomen area, an armpit area, and a lower back area and the first zone is located in at least one of the shoulder area, armpit area, abdomen area, and lower back area.

14. A zoned moisture management garment comprising:
a first fabric layer comprising a first non-dissolvable yarn of a first denier per filament of between about 0.50 and about 1.04; and
a second fabric layer adjacent the first fabric layer, the second fabric layer comprising a first zone and a second zone, the second fabric layer further comprising a second non-dissolvable yarn of a second denier per filament greater than the first denier per filament and a first dissolvable yarn of a third denier per filament greater than the first denier per filament, wherein the second denier per filament and the third denier per filament are between about 1.04 and about 3.50 and a denier differential between the first denier per filament and the second denier per filament is at least about 0.54, wherein the first zone of the second fabric layer comprises the first dissolvable yarn dissolved and the second non-dissolvable yarn, and wherein the second zone of the second fabric layer comprises the first dissolvable yarn and the second non-dissolvable yarn, and wherein the first zone and the second zone are seamlessly adjacent forming a mesh fabric structure, and wherein the second fabric layer is the inner most layer of the garment when the garment is worn.

15. The zoned moisture management garment of claim 14, the first fabric layer further comprising a second dissolvable yarn of a fourth denier per filament of between about 0.50 and about 1.04, wherein at least one zone of the first fabric layer has the second dissolvable yarn dissolved.

16. The zoned moisture management garment of claim 14, wherein the first zone of the second fabric layer is placed according to a sweat profile of an athlete, wherein the sweat profile comprises at least one area of increased sweating.

17. The zoned moisture management garment of claim 14, wherein the first non-dissolvable yarn and the second non-dissolvable yarn are synthetic.

18. The zoned moisture management garment of claim 14, wherein the first fabric layer is knitted and the second fabric layer is knitted.

19. The zoned moisture management garment of claim 14, wherein the first fabric layer is woven and the second fabric layer is woven.

20. The zoned moisture management garment of claim 14, wherein the first dissolvable yarn comprises between 10 and 40 percent of the zoned moisture management garment.

21. The zoned moisture management garment of claim 14, wherein the first zone of the second fabric layer having the second dissolvable yarn dissolved is a pattern, logo, or shape.

22. The zoned moisture management garment of claim 14, further comprising at least one additional fabric layer of a third non-dissolvable yarn of a fifth denier per filament.

23. The zoned moisture management garment of claim 22, the at least one additional fabric layer further comprising a third dissolvable yarn of a sixth denier per filament, wherein at least one zone of the at least one additional fabric layer has the third dissolvable yarn dissolved.

24. A zoned moisture management garment comprising:
a first fabric layer comprising a first non-dissolvable yarn of a first denier per filament between about 0.50 and about 1.04;
a second fabric layer comprising an inner-most layer of the garment when the garment is worn, the second fabric layer adjacent the first fabric layer and comprising a first dissolvable yarn and a second non-dissolvable yarn of a second denier per filament greater than the first denier per filament, wherein the second denier per filament is between 1.04 and 3.50 and a denier differential between the first denier per filament and the second denier per filament is at least about 0.54, the second fabric layer comprising a first zone and a second zone, wherein the first zone of the second fabric layer comprises the first dissolvable yarn dissolved and the second non-dissolvable yarn, and wherein the second zone of the second fabric layer comprises the first dissolvable yarn and the second non-dissolvable yarn, wherein the first zone and the second zone are seamlessly adjacent to form a mesh fabric structure, and wherein the first zone is determined by a sweat profile, wherein the sweat profile comprises at least one area of increased sweating.

25. The zoned moisture management garment of claim 24, wherein the first non-dissolvable yarn and the second non-dissolvable yarn are synthetic.

26. The zoned moisture management garment of claim 24, wherein the garment is a shirt having a shoulder area, a chest area, an upper back area, an abdomen area, an armpit area, and a lower back area and the first zone is located at the shoulder area, armpit area, abdomen area, and lower back area.

27. The zoned moisture management garment of claim 24, wherein the first fabric layer is woven and the second fabric layer is woven.

28. The zoned moisture management garment of claim 24, wherein the first fabric layer is knitted and the second fabric layer is knitted.

29. The zoned moisture management garment of claim 24, wherein the first dissolvable yarn comprises between 10 and 40 percent of the zoned moisture management garment.

30. The zoned moisture management garment of claim 24, wherein the first zone having the first dissolvable yarn dissolved is a pattern, logo, or shape.

31. The zoned moisture management garment of claim 24, further comprising at least one additional fabric layer of a third non-dissolvable yarn of a third denier per filament.

32. The zoned moisture management garment of claim 31, the at least one additional fabric layer further comprising a second dissolvable yarn, wherein at least one zone of the at least one additional fabric layer has the second dissolvable yarn dissolved.

33. A zoned moisture management garment comprising:
a first fabric layer comprising a first non-dissolvable yarn of a first denier per filament between about 0.50 and about 1.04;
a second fabric layer adjacent the first fabric layer comprising a second non-dissolvable yarn of a second denier per filament greater than the first denier per filament, wherein the second denier per filament is between 1.04 and 3.50 and a denier differential between the first denier per filament and the second denier per filament is at least about 0.54, and wherein the second fabric layer is the inner most layer of the garment when the garment is worn;
the second fabric layer further comprising a first dissolvable yarn; the second fabric layer further comprising a first zone and a second zone, wherein the first zone has the first dissolvable yarn dissolved and the second zone has the first dissolvable yarn and the second non-dissolvable yarn, the first zone at a location of the zoned moisture management garment determined by a sweat profile of an athlete and a contact map of the zoned moisture management garment to the athlete, wherein the sweat profile includes at least one area of increased sweating and wherein the contact map of an athlete includes at least one area of increased contact and at least one area of less contact and the location for the first zone is generally in the at least one area of less contact, and wherein the first zone and the second zone are seamlessly adjacent forming a mesh fabric structure.

34. The zoned moisture management garment of claim 33, wherein the first non-dissolvable yarn and the second non-dissolvable yarn are synthetic.

35. The zoned moisture management garment of claim 34, wherein the first non-dissolvable yarn and the second non-dissolvable yarn are polyester.

36. The zoned moisture management garment of claim 33, wherein the first fabric layer and the second fabric layer are woven.

37. The zoned moisture management garment of claim 33, wherein the first fabric layer and the second fabric layer are knitted.

38. The zoned moisture management garment of claim 33, wherein the first dissolvable yarn comprises between 10 and 40 percent of the zoned moisture management garment.

39. The zoned moisture management garment of claim 33, further comprising at least one additional fabric layer of a third non-dissolvable yarn of a third denier per filament.

40. The zoned moisture management garment of claim 39, the at least one additional fabric layer further comprising a second dissolvable yarn, wherein at least one zone of the at least one additional fabric layer has the second dissolvable yarn dissolved.

* * * * *